United States Patent [19]
Wode et al.

[11] Patent Number: 5,267,725
[45] Date of Patent: Dec. 7, 1993

[54] AIR SPRING HAVING A SLEEVE-TYPE FLEXIBLE MEMBER MADE OF ELASTOMERIC MATERIAL

[75] Inventors: Stefan Wode; Bernd Hasselbring, both of Hanover; Eckhard Schneider, Lehrte, all of Fed. Rep. of Germany

[73] Assignee: Continental Aktiengesellschaft, Hanover, Fed. Rep. of Germany

[21] Appl. No.: 959,428

[22] Filed: Oct. 13, 1992

[30] Foreign Application Priority Data

Oct. 12, 1991 [DE] Fed. Rep. of Germany ....... 4133878

[51] Int. Cl.⁵ .......................... B60G 11/27; F16F 9/05
[52] U.S. Cl. .................... 267/64.27; 267/122
[58] Field of Search .............. 267/64.27, 64.23, 64.24, 267/64.19, 64.21, 122; 277/212 FB, 212 F, 225, 214, 212 R, 211, 180, 178, 189; 280/711

[56] References Cited

U.S. PATENT DOCUMENTS

| | | |
|---|---|---|
| 4,657,229 | 4/1987 | Thurow . |
| 4,784,376 | 11/1988 | Ecktman . |
| 4,787,606 | 11/1988 | Geno et al. ............... 267/64.24 X |
| 4,852,861 | 8/1989 | Harris ................. 267/64.27 |
| 4,899,995 | 2/1990 | Hoffman et al. ............ 267/64.27 |
| 4,946,144 | 8/1990 | Geno et al. . |

FOREIGN PATENT DOCUMENTS

| | | |
|---|---|---|
| 0151696 | 8/1985 | European Pat. Off. . |
| 0379667 | 8/1990 | European Pat. Off. . |
| 3112133 | 10/1982 | Fed. Rep. of Germany . |
| 0037438 | 2/1991 | Japan ................. 267/64.27 |

*Primary Examiner*—Douglas C. Butler
*Attorney, Agent, or Firm*—Walter Ottesen

[57] ABSTRACT

The invention is directed to an air spring having a sleeve-type flexible member made of elastomeric material. The flexible member has end sections which are attached to connecting parts by radially plastically deformed clamping rings. The clamping ring attaches an end section of the sleeve-type flexible member to a particular connecting part with a friction-contact connection to enable the attachment of the flexible member to withstand higher pull-out forces.

9 Claims, 1 Drawing Sheet

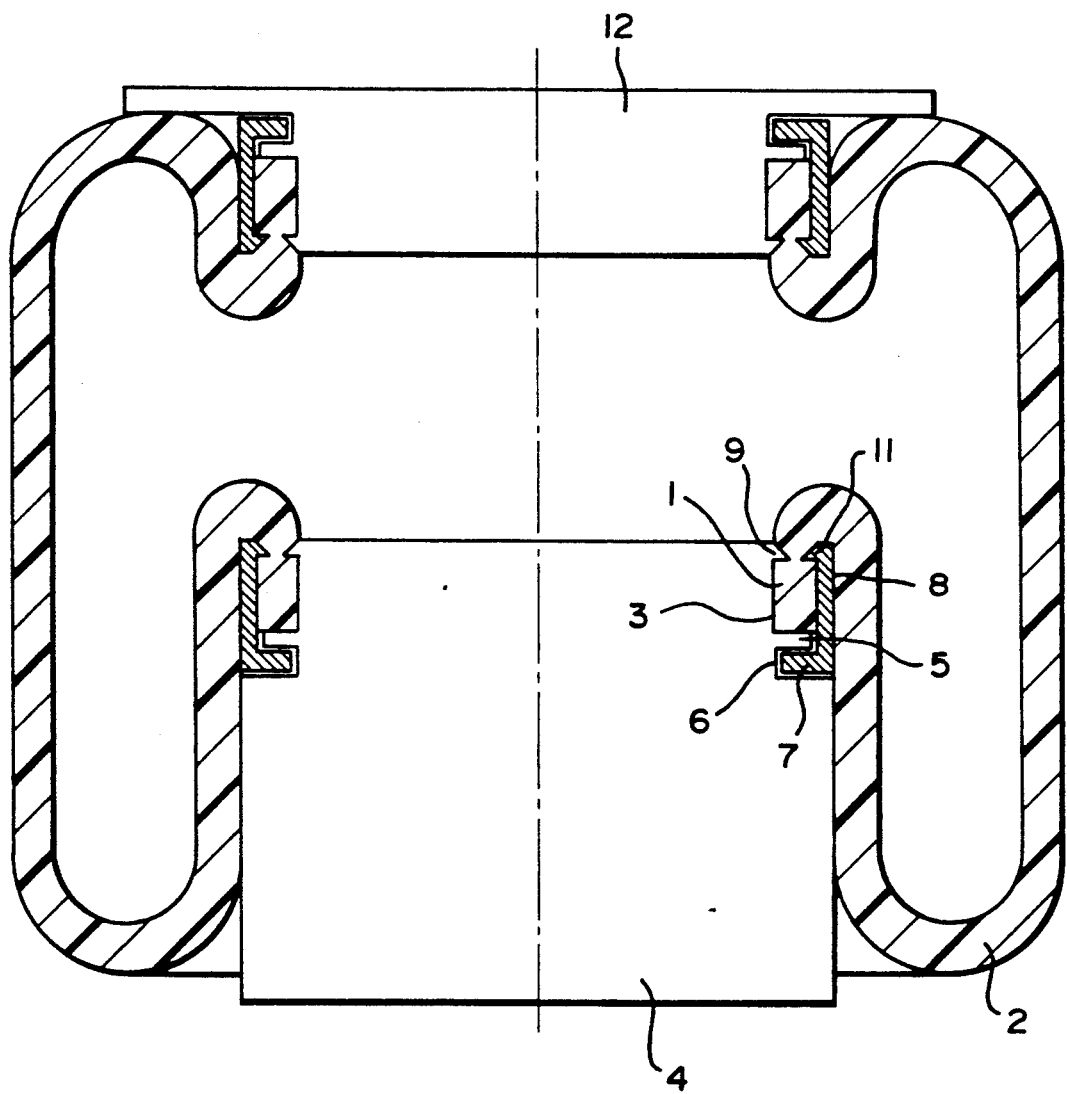

AIR SPRING HAVING A SLEEVE-TYPE FLEXIBLE MEMBER MADE OF ELASTOMERIC MATERIAL

FIELD OF THE INVENTION

The invention relates to an air spring having a sleeve-type flexible member made of elastomeric material. The flexible member has end sections which are connected to respective connecting parts by corresponding radially plastically deformed clamping rings.

BACKGROUND OF THE INVENTION

The conventional air-spring flexible members are provided for higher loads in larger motor vehicles and are provided with sealing beads having form-rigid core rings embedded therein. Compared to these conventional air-spring flexible members, the sleeve-type flexible members afford the advantage of being especially inexpensive to manufacture and the possibility is provided to produce the same by a simple mechanical separation from longer lengths of the flexible members. The sleeve-type flexible members are provided primarily for use in automobiles. The end sections of the sleeve-type flexible member are of the same size and are attached to respective connecting parts mounted on the chassis and motor vehicle axle assembly, respectively. Continuous, radially plastically deformable clamping rings for clamping the end sections to these connecting parts have been proven in use. The end sections of the sleeve-type flexible members are clamped in friction-tight engagement by the radial deformation of the clamping rings.

The pull-out force of the sleeve-type flexible member is limited by the frictional resistance of the clamped end sections. It is possible that the end sections are slowly pulled out of the clamp during operation of the motor vehicle which would constitute a failure of the air spring.

Published European patent application 0,151,696 discloses that a higher pull-out force of the clamped end section can be obtained in that one end section of the sleeve-type flexible member is pushed over a stub-shaped projection which is provided with circular peripheral ribs. These peripheral ribs penetrate into the elastically yieldable wall of the flexible member under the influence of the radially inwardly directed pressing force of the deformed clamping ring pushed thereover so that the frictional-resistive effective clamping is additionally augmented by a form-tight engagement in the wall of the sleeve-type flexible member. The pull-out force is increased by means of this configuration. However, too great a pressing force applied by the radially deformed clamping ring on the end section of the sleeve-type flexible member can be disadvantageous since it can lead to damage of the elastomeric material and the reinforcement layers. The pressing force becomes too great because of different manufacturing tolerances.

SUMMARY OF THE INVENTION

It is an object of the invention to provide an air spring of the kind described above which is so configured that the attachment of its sleeve-type flexible member can be subjected to higher pull-out forces.

The air spring of the invention includes: a sleeve-type flexible member made of elastomeric material and having an end portion; a connecting part for receiving the end portion thereon; a radially plastically deformed clamping ring placed over the end portion and the connecting part for clamping the end portion to the connecting part to provide an attachment to hold the flexible member against pull-out forces applied thereto during operation of the air spring; the clamping ring having a portion in direct contact engagement with a portion of the connecting part so that the portions conjointly define an interface; and, frictional contact engaging means formed at the interface so as to enable the attachment to withstand greater pull-out forces.

The clamping ring is not only pressed against the wall of the sleeve-type flexible member but also against the connecting part. Thus, the clamping ring is pressed so as to be in frictional contact engagement with the connecting part on which the flexible member is attached. In this way, the flexible member can no longer slip with the clamping ring from the connecting part. The attachment of the sleeve-type flexible member provides an increased resistance to pulling or tensile forces which leads to an increased pull-out force. Stated otherwise, the attachment can now withstand pull-out forces greater than heretofore.

In an advantageous embodiment of the invention, a portion of the clamping ring is attached to the particular connecting part with adhesive or by spot welding. In this way, a most cost effective attachment is achieved.

According to another embodiment of the invention, the clamping ring is connected with a portion thereof to the connecting part so as to provide a form-tight engagement therewith. The form-tight engagement is provided by a constructive measure and makes possible a considerable increase of the pull-out force of the attached sleeve-type flexible member.

According to another feature of the invention, the frictional attachment of the end section is further increased by holding ribs effecting a form-tight engagement in the wall of the flexible member.

With the invention, the clamping ring attaching the end section of the sleeve-type flexible member to the connecting part is itself connected with this connecting part in frictional-contact engagement. The pull-out force of the flexible member is significantly increased.

BRIEF DESCRIPTION OF THE DRAWING

The drawing is a side elevation view, in section, of an embodiment of the air spring of the invention having a sleeve-type flexible member and a clamping ring for attaching the end section of the flexible member to a connecting part of a motor vehicle.

DESCRIPTION OF THE PREFERRED EMBODIMENT OF THE INVENTION

The end section 1 of a beadless sleeve-type flexible member 2 is pushed onto a cylindrical projection 3 of a connecting part attached to the axle assembly of a motor vehicle and is configured as a roll-off piston 4. The upper connecting part 12 can be connected to the vehicle frame. The cylindrical projection 3 is stepped inwardly with respect to the outer surface of the roll-off piston so that the projection 3 has a diameter less than the piston at its roll-off surface thereby defining a step 5.

The roll-off piston 4 is provided with a circular slot 6 directly below the step 5 into which a circular projection 7 extends radially inwardly. This projection 7 is part of a metallic, radially plastically deformed clamping ring 8 placed on the projection 3. The clamping ring 8 clamps the end section 1 of the flexible member 2 between itself and the projection 3.

The projection 3 of the roll-off piston 4 is provided at its upper end with a circular holding rib 9 which is at the same elevation as a circular holding rib 11 of the clamping ring 8. The holding rib 11 projects inwardly and the two holding ribs 9 and 11 lie opposite each other as shown. The two mutually adjacent holding ribs 9 and 11 have penetrated the elastically-yielding wall of the end section 1 of the flexible member 2 under the influence of the radially inwardly directed pressing force of the clamping ring 8 which has been pushed over the end section.

The frictionally resistive effective clamping of the flexible member 2 by the radially plastically deformed clamping ring 8 is supplemented and intensified by the holding ribs 9 and 11 because of the form fit engagement. The circular projection 7 of the clamping ring 8 connects the clamping ring in form-tight engagement with the roll-off piston 4 which leads to a significant increase of the pull-out force of the sleeve-type flexible member.

Referring to the drawing, the clamping ring 8 has a portion thereof in direct contact engagement with a portion of connecting part (roll-off piston 4) so that these portions conjointly define an interface at the step 5. Adhesive means can be placed at this interface or spot welds can be applied to further increase the pull-out forces which can be resisted.

It is understood the the foregoing description is that of the preferred embodiments of the invention and that various changes and modifications may be made thereto without departing from eh spirit and scope of the invention as defined in the appended claims.

What is claimed is:

1. An air spring comprising:
   a sleeve-type flexible member made of elastomeric material and having an end portion;
   a connecting part defining a cylindrical radial step for receiving said end portion thereon;
   a radially plastically deformed clamping ring in place over said end portion and said connecting part for clamping said end portion to said connecting part to provide an attachment to hold said flexible member on said connecting part against pull-out forces applied to said flexible member during operation of the air spring;
   said clamping ring and said connecting part conjointly defining uniform annular gap in which said end portion is claimed;
   said clamping ring having a portion thereof in direct contact engagement with a portion of said connecting part below said step so that said portions conjointly define an interface; and,
   frictional contact engaging means formed only at said interface so as to enable said attachment to provide added resistance to said pull-out forces.

2. The air spring of claim 1, further comprising adhesive means disposed at said interface.

3. The air spring of claim 1, further comprising spot welds at said interface.

4. The air spring of claim 1, said portions being configured so as to conjointly define form-tight engagement means for providing a form-fit engagement of said portions to each other.

5. The air spring of claim 1, said frictional contact engaging means being comprised by: said portion of said clamping ring having radially inwardly directed projection means; and, said portion of said connecting part having a recess means formed therein for receiving said projection means therein thereby providing a form-tight engagement of said portions onto each other.

6. The air spring of claim 5, said projection means being a circularly-shaped -projection of said clamping ring; and, said recess means being a circularly-shaped annular slot formed in said connecting part for receiving said projection therein.

7. The air spring of claim 1, said clamping ring having a holding rib formed thereon in spaced relationship to said engaging means so as to penetrate into said end portion.

8. The air spring of claim 1, said connecting part having a holding rib formed thereon in spaced relationship to said engaging means so as to penetrate into said end portion.

9. The air spring of claim 1, said clamping ring having a holding rib formed thereon in spaced relationship to said engaging means so as to penetrate into said end section; and, said connecting part having a holding rib formed thereon in spaced relationship to said engaging means so as to likewise penetrate into said end portion.

* * * * *

UNITED STATES PATENT AND TRADEMARK OFFICE
CERTIFICATE OF CORRECTION

PATENT NO. : 5,267,725
DATED : December 7, 1993
INVENTOR(S) : S. Wode et al It is certified that error appears in the above-identified patent and that said Letters Patent is hereby corrected as shown below:

Column 3, line 17, delete "the" and substitute -- a -- therefor.

In column 3, line 35: delete "eh" and substitute -- the -- therefor.

In column 4, line 4: between "defining" and "uniform", insert -- a --.

In column 4, line 5: delete "claimed" and substitute -- clamped -- therefor.

In column 4, line 27: delete "onto" and substitute -- to -- therefor.

In column 4, line 29: delete "-projection" and substitute -- projection -- therefor.

Signed and Sealed this

Third Day of May, 1994

*Attest:*

BRUCE LEHMAN

*Attesting Officer*          *Commissioner of Patents and Trademarks*